United States Patent [19]

Blakely

[11] Patent Number: 4,812,534

[45] Date of Patent: Mar. 14, 1989

[54] IMPACT TOUGHENED POLYESTER NYLON BLENDS

[75] Inventor: Dale M. Blakely, Kingsport, Tenn.

[73] Assignee: Eastman Kodak Company, Rochester, N.Y.

[21] Appl. No.: 179,366

[22] Filed: Apr. 4, 1988

[51] Int. Cl.$^4$ .................... C08L 67/02; C08L 77/02
[52] U.S. Cl. .................... 525/425; 525/432; 525/434
[58] Field of Search ............... 525/425, 432, 434

[56] References Cited

U.S. PATENT DOCUMENTS

| | | | |
|---|---|---|---|
| 4,217,435 | 8/1980 | McConnell et al. | 525/425 |
| 4,229,340 | 10/1980 | Druin et al. | 525/425 |
| 4,309,518 | 1/1982 | Horlbeck et al. | 525/425 |

Primary Examiner—John C. Bleutge
Assistant Examiner—A. Carrillo
Attorney, Agent, or Firm—J. Frederick Thomsen; William P. Heath, Jr.

[57] ABSTRACT

A molding composition, comprising:
(i) 99-50 weight percent of a polymer blend comprising,
  (a) 5-95 weight percent nylon 6; and
  (b) 95-5 weight percent of a polyester copolymer comprising terephthalic acid and glycol monomer units, said glycol comprising 1,4-cyclohexylene dimethanol, and $C_{2-6}$ alkylene glycol monomer units; and
(ii) 1-50 weight percent of a copolyesterpolyamide comprising $C_{6-15}$ alkylene dicarboxylic acid, diamine and diol monomer units, wherein said diol is a $C_{2-6}$ alkylene diol or cyclohexane dimethanol and said diamine is a $C_{4-8}$ alkylene diamine or a $C_{4-10}$ cyclic diamine.

11 Claims, No Drawings

IMPACT TOUGHENED POLYESTER NYLON BLENDS

BACKGROUND OF THE INVENTION

1. Field of the Invention

The invention relates to molding compositions and engineering plastics having improved impact strengths, especially notched Izod strength. More specifically, the invention relates to blends of nylong and copolyesters which additionally contain polyesteramides, which have substantially improved impact strengths in combination with good flexural and tensile properties.

2. Discussion of the Background

Polymer blends or polyblends are mixtures of structurally different polymers or copolymers. Commercially important polyblends are generally mechanical polyblends which are made by melt-blending the various polymers in an extruder or other suitable intensive mixer. Polymer blending technology generally rests on the premise of property additivity, wherein the polymer blend has the combined properties which are found in each of the component polymers separately. A polymer blend can therefore have properties which are unavailable to the individual polymer components by themselves.

Blending of polymers is also cost efficient. Expensive polymers may be blended with inexpensive polymers to obtain a useful polyblend which has a cost:performance ratio that makes it very attractive for any given application. The standards of performance for any given application can therefore be met using blends of two known polymers without the need to develop completely new polymers and new plant equipment. There is a continuing need for novel and useful polymer blends.

Engineering plastics such as molding compositions should generally have a good balance of high tensile properties, stiffness, compressive and sheer strength as well as impact resistance and should be easily moldable. Their physical properties should be reproducible and predictable and they should retain their physical properties over a wide range of heat and chemical conditions. Engineering plastics should be able to resist mechanical stress for long periods of time.

Nylon polymers, and in particular nylon 6 and nylon 6,6, have been known since the 1950's and were one of the first engineering thermoplastics to become commercially available. Nylon may be injection molded or may be extruded into sheets, films or profiles as well as blow molded. The wide variability in the melt-processability of nylon engineering plastics has led to their extensive use in the formation of fibers and filaments, bottles, rods and tubes, as well as large injection molded and cast industrial, appliance and automotive parts. Polymer blends containing nylon are very important engineering plastics. The properties of the polymer blend containing nylon can be advantageously adjusted by blending nylon with other types of polymers to obtain a polymer blend having properties which cannot be obtained by either of the individual components of the polymer blend. There continues to be a need for new engineering polymer blends based on nylon to meet the increasing demands placed on engineering plastic components.

SUMMARY OF THE INVENTION

Accordingly, one object of the present invention is to provide a polymer blend having improved impact strength while maintaining a high level of other mechanical properties such as, for example, elongation at break and flexural and tensile properties.

Another object of the invention is to provide molding compositions comprising blends of nylon 6 and copolyesters.

These and other objects of the invention which will become apparent from the following specification have been achieved by the present molding composition which comprises (i) 99-50 weight percent of a polymer blend comprising (a) 5-95 weight percent of nylon 6 and (b) 95-5 weight percent of a polyester copolymer comprising terephthalic acid; 1,4-cyclohexanedimethanol; and $C_{2-6}$ alkylene glycol monomer units; and (ii) 1-50 weight percent certain polyesteramides.

DETAILED DESCRIPTION OF THE PREFERRED EMBODIMENTS

The present invention comprises polymer blends of nylon 6 and copolyesters based on terephthalate acid/1,4-cyclohexylenedimethanol/alkylene glycol monomer units modified with up to 50 weight percent of certain polyesteramides described in detail hereinbelow. The nylon 6-copolyester component of my novel polymer blends contains from 5-95 weight percent of nylon 6 and from 95-5 weight percent of the polyester copolymer. The inclusion of the polyesteramide in the polymer blend results in a marked increase in Izod strengths, especially notched Izod impact strength, while maintaining a high level of tensile strength and flexural strength properties.

Nylon 6 which is suitable for use in the present invention is well known and is available commercially. Nylon 6 is generally made by heating caprolactam which results in ring opening and subsequent polymerization. Any known polymerization method may be used to prepare the nylon 6 of the present invention, such as for example, polymerization in aqueous solution or melt polymerization.

Preferred nylon 6 has an inherent viscosity between about 0.6 and about 2.5. Particularly preferred nylon 6 has an inherent viscosity between about 1.0 and about 1.5.

The polyester copolymer component of the novel polymer blends provided by the present invention is prepared by polymerizing terephthalic acid; 1,4-cyclohexanedimethanol and alkylene glycol monomers. The only acid component of the copolyester is terephthalic acid whereas the glycol component is a combination of cyclohexanedimethanol and an alkylene glycol or mixture of alkylene glycols. Alkylene glycols having from 2-6 carbon atoms are preferred, with ethylene glycol being particularly preferred.

The glycol component generally is comprised of from 5-95 mole percent of the alkylene glycol, the remainder being cyclohexanedimethanol. Preferably the alkylene glycol comprises from 30-70 mole percent of the glycol component. Specific examples of the polyester copolymer include copoly(68/32 1,4-cyclohexylenedimethylene/ethyleneterephthalate) known as PCTG 5445 and copoly(31/69 1,4-cyclohexylene dimethylene/ethylene terephthalate) known as PETG 6763 available from Eastman Chemical Products, Inc., Kingsport, Tenn. The figures 68/32 and 31/69 designate the respective mole percents of the residues derived from 1,4-cyclohexanedimethanol and ethylene glycol which are present in these polyesters. The preferred polyester copolymers have an inherent viscosity in the range of from about 0.4 to about 1.5, with a preferred inherent viscosity range of from about 0.5 to about 0.8.

While the nylon 6-copolyester component of the molding compositions of the present invention may comprise from 5-95 weight percent nylon 6 and 95-5 weight percent of the above-described polyester copolymer, it normally will contain from 25-80, preferably 50-80, weight percent nylon 6 and from 20-75, preferably 20-50, weight percent of polyester copolymer.

As the nylon 6 content of the molding compositions is increased, the tensile strength at break and the elongation at break normally increase. However, when the nylon 6 content of the compositions exceeds approximately 75 weight percent in both the tensile strength and elongation at break decrease with a marked drop occurring as the nylon 6 content approaches 100 weight percent. Thus, it is preferred that the nylon 6 content of the nylon 6-polyester copolymer component of the novel polymer blends not exceed 80 weight percent to ensure adequate overall properties.

The polyesteramide component of the polymer blends provided by the present invention are copolymers derived from aliphatic dicarboxylic acids, glycols and diamines. Examples of polyesteramides which may be used to make the present molding compositions are disclosed in U.S. Pat. No. 4,459,400, incorporated herein by reference.

The aliphatic dicarboxylic acids may have from 6-15 carbon atoms such as, for example, 1,6-hexanedioic acid (adipic acid), 1,7-heptanedioic acid, 1,8-octanedioc acid, 1,9-nonanedioc acid (azeleic acid), 1,10-decanedioc acid, 1,11-undecanedioc acid, etc. Dicarboxylic acids having longer carbon chains, i.e., 11-15 carbon atoms, are more flexible and generally provide better impact strength than dicarboxylic acids having shorter carbon chains such as adipic acid. Preferred dicarboxylic acids are those having from 9-13 carbon atoms with azeleic acid being the most preferred.

The glycol component of the polyesteramides preferably is an alkylene glycol having from 2-6 carbon atoms, with 1,4-butanediol being most preferred. The diol also may be an alicyclic glycol such as for example cyclohexanedimethanol so long as polymers containing residues of the alicyclic glycol have sufficient chain flexibility to impart improved impact strength to the polymer blend. Alicyclic glycols, similar to cyclohexanedimethanol, having 5-8 ring carbon atoms are preferred.

The diamine monomer component is preferably an alkylene diamine having from 2-8 carbon atoms, such as ethylenediamine and hexamethylenediamine. The diamine component may also be an alicyclic diamine having 5-8 carbon atoms in the alicyclic ring, such as 1,4-cyclohexane-bis-methylamine or other similar alicyclic diamines. Preferred aliphatic and alicyclic diamines are the alkylenediamines having from 2-6 carbon atoms and 1,4-cyclohexane-bis-methylamine.

The diamine monomer component also may be a cyclic, nonaromatic diamine in which the nitrogen atoms are ring members, i.e., diazacycloalkanes. The diazacycloalkane may contain 5-8 ring atoms such as, for example, imidazolidine and piperazine (diethylene diamine), with the latter being the preferred of the diazacycloalkanes.

The combined glycol/diamine residues of the polyesteramide typically are comprised of from 5-95 mole percent glycol and from 95-5 mole percent diamine residue. Preferably, the glycol residue comprises from 75-90 mole percent and the diamine residue comprises from 10-25 mole percent or, alternatively, the glycol residue comprises 10-25 mole percent and the diamine residue 75-90 mole percent of the combined glycol/diamine residues.

Specific examples of suitable polyesteramides include (1) the polyesteramide derived from azelaic acid, 80 mole percent 1,4-butanediol and 20 mole percent hexamethylenediamine having an I.V. of 1.35 (referred to hereinafter as PBAS 5633) and (2) the polyesteramide derived from azelaic acid, 15 mole percent 1,4-cyclohexanedimethanol and 85 mole percent piperazine having an I.V. of 1.0 (referred to hereinafter as PPAG 5913).

The polyesteramide component generally comprises from at least 1 and up to 50 weight percent of the novel molding composition. The novel polymer blends containing from 5-30, especially 10-20, weight percent polyesteramide exhibit an excellent balance of properties including a substantial increase in impact strength.

The blends of the present invention are prepared by first obtaining or preparing the polyester copolymer nylon 6, and polyesteramide polymers. The polymers are then blended together in a mixer, such as a twin-screw extruder or similar intensive mixing means. Extrusion temperatures are generally in the range of about 200°-350° C. The molding compositions of the present invention may be processed using known and readily available processing equipment. The blends of the present invention are useful for the preparation of housings, supports, connections and other structural and industrial parts. If desired, conventional additives such as antioxidants, processing aids and crystallization aids may be added to the molding compositions of the present invention in amounts so that the physical properties such as strength and stiffness are not substantially degraded.

Other features of the invention will become apparent in the course of the following descriptions of exemplary embodiments which are given for illustration of the invention and are not intended to be limiting thereof.

Polymer blends containing varying proportions of PCTG or PETG polyester and nylon 6 with and without 10 weight percent of the polyesteramides PBAS 5633 or PPAG 5913 were prepared by compounding the polymer components in a Werner & Pfleiderer twin screw extruder. The polymer blends thus obtained were molded on a Newbury injection molding apparatus. The extrusion and molding temperatures were 260°-270° C. The amounts of each polymer component in the blends of Examples 1-18 shown in Table I designate a weight percent based on the total weight of the blend.

TABLE I

| Ex. | Polyester | | Nylon 6 | Polyesteramide | |
|---|---|---|---|---|---|
| | PCTG | PETG | | PBAS 5633 | PPAG 5913 |
| 1 | 75.0 | — | 25.0 | — | — |
| 2 | 67.5 | — | 22.5 | 10.0 | — |
| 3 | 67.5 | — | 22.5 | — | 10.0 |
| 4 | 50.0 | — | 50.0 | — | — |
| 5 | 45.0 | — | 45.0 | 10.0 | — |
| 6 | 45.0 | — | 45.0 | — | 10.0 |
| 7 | 25.0 | — | 75.0 | — | — |
| 8 | 22.5 | — | 67.5 | 10.0 | — |
| 9 | 22.5 | — | 67.5 | — | 10.0 |
| 10 | — | 75.0 | 25.0 | — | — |
| 11 | — | 67.5 | 22.5 | 10.0 | — |
| 12 | — | 67.5 | 22.5 | — | 10 |

TABLE I-continued

| Ex. | Polyester | | | Polyesteramide | |
|---|---|---|---|---|---|
| | PCTG | PETG | Nylon 6 | PBAS 5633 | PPAG 5913 |
| 13 | — | 50.0 | 50.0 | — | — |
| 14 | — | 45.0 | 45.0 | 10.0 | — |
| 15 | — | 45.0 | 45.0 | — | 10 |
| 16 | — | 25.0 | 75.0 | — | — |
| 17 | — | 22.5 | 67.5 | 10.0 | — |
| 18 | — | 22.5 | 67.5 | — | 10.0 |

The inherent viscosity (IV, after molding), the tensile and flexural properties and the impact strengths for each of the blends of Examples 1–18 are set forth in Table II.

The data set forth in Table II shows that the novel blend of the invention containing a polyesteramide exhibit substantially improved notched Izod impact strengths. While the presence of polyesteramide tended to be detrimental to the tensile and flexural properties, the effect was only minor and these properties remained satisfactory for most shaped articles.

TABLE II

| Example | IV | Tensile (psi) | | % Elong. at Break | Flexural (psi) | | Notched Izod (ft-lb/in) | | |
|---|---|---|---|---|---|---|---|---|---|
| | | Yield | Break | | Strength × 10³ | Modulus × 10⁵ | 23° C. | −29° C. | −40° C. |
| 1 | .848 | 5730 | 8230 | 190 | 10.47 | 2.46 | 1.14 | .92 | .53 |
| 2 | .856 | 5200 | 7600 | 164 | 9.41 | 2.33 | 3.82 | 1.67 | 2.08 |
| 3 | .875 | 5120 | 7510 | 201 | 8.73 | 2.06 | 9.32 | 1.80 | 1.31 |
| 4 | .959 | 5710 | 9660 | 250 | 11.51 | 2.81 | .94 | .56 | .53 |
| 5 | 1.035 | 4530 | 6000 | 281 | 8.74 | 1.88 | 2.18 | 1.68 | 1.33 |
| 6 | 1.032 | 4610 | 8760 | 238 | 9.08 | 2.05 | 1.77 | 1.32 | 1.10 |
| 7 | 1.154 | 5130 | 12560 | 298 | 10.98 | 2.50 | .94 | .56 | .46 |
| 8 | 1.182 | 4540 | 9470 | 248 | 9.09 | 1.91 | 2.21 | 1.74 | 1.18 |
| 9 | 1.211 | 4130 | 9570 | 257 | 9.96 | 2.39 | 1.70 | 1.20 | .98 |
| 10 | .832 | 6340 | 11150 | 287 | 10.89 | 2.57 | 1.11 | .55 | .39 |
| 11 | .862 | 5690 | 7670 | 214 | 9.82 | 3.12 | 1.53 | 1.23 | 1.19 |
| 12 | .886 | 5670 | 9590 | 295 | 10.90 | 2.77 | 2.46 | 1.02 | .84 |
| 13 | 1.029 | 5520 | 11910 | 312 | 11.68 | 2.89 | 1.12 | .93 | .75 |
| 14 | .970 | 4580 | 7590 | 245 | 9.56 | 2.43 | 1.67 | 1.23 | 1.11 |
| 15 | 1.018 | 4790 | 11270 | 310 | 10.38 | 2.71 | 1.12 | .96 | .78 |
| 16 | 1.216 | 5400 | 14540 | 432 | 11.63 | 3.34 | 1.05 | .77 | .72 |
| 17 | 1.052 | 4610 | 11190 | 294 | 8.92 | 2.22 | 1.08 | .87 | .75 |
| 18 | 1.184 | 3980 | 10990 | 500 | 10.15 | 2.51 | 1.09 | .82 | .67 |

The inherent viscosity (I.V.) values reported herein are determined at 25° C. using 0.50 g of polymer per 100 mole of a solvent consisting of 60 weight percent phenol and 40 weight percent tetrachloroethane.

The physical properties set forth in Tables 1 and 2 were determined using the following procedures:
  Tensilte Strength: ASTM Procedure D638.
  Elongation at Break: ASTM Procedure D638.
  Flexural Strength: ASTM Procedure D790.
  Flexural Modulus: ASTM Procedure D790.
  Notched Izod Strength: ASTM Procedure D256.

Obviously, numerous modifications and variations of the present invention are possible in light of the above teachings. It is therefore to be understood that within the scope of the appended claims, the invention may be practiced otherwise than as specifically described herein.

I claim:

1. A molding composition, comprising:
   (i) 99-50 weight percent of a polymer blend comprising,
      (a) 5-95 weight percent nylon 6; and
      (b) 95-5 weight percent of a polyester copolymer comprising terephthalic acid and glycol monomer units, said glycol comprising 1,4-cyclohexylenedimethanol and $C_{2-6}$ alkylene glycol monomer units; and
   (ii) 1-50 weight percent of a polyesteramide comprising $C_{6-15}$ alkylene dicarboxylic acid, diamine and glycol monomer units, wherein said glycol is a $C_{2-6}$ alkylene glycol or an alicyclic glycol having 5-8 ring carbon atoms, and said diamine is a $C_{2-8}$ alkylene diamine, an alicyclic diamine having 5-8 ring carbon atoms or a diazacycloalkane comprising a 5-8 membered ring.

2. The molding composition of claim 1, wherein said nylon 6 is present in an amount of 50-80 weight percent and said polyester copolymer is present in an amount of 50-20 weight percent.

3. The molding composition of claim 1, wherein said nylon 6 has an inherent viscosity of between about 0.6 and about 2.5 determined at 25° C. using 0.50 g of polymer per 100 mole of a sovent consisting of 60 weight percent phenol and 40 weight percent tetrachloroethane.

4. The molding composition of claim 3, wherein said nylon 6 has an inherent viscosity between 1.0 and about 1.5.

5. The molding composition of claim 1, wherein the glycol component of (b) comprises from 5-95% of said $C_{2-6}$ alkylene glycol monomer units, the remainder comprising 1,4-cyclohexylenedimethanol monomer units.

6. The molding composition of claim 1, wherein said polyester copolymer has an inherent viscosity in the range from about 0.4 to about 1.5 determined at 25° C. using 0.50 g of polymer per 100 mole of a solvent consisting of 60 weight percent phenol and 40 weight percent tetrachloroethane.

7. The molding composition of claim 6, wherein said polyester copolymer has an inherent viscosity in the range from about 0.5 to about 0.8.

8. A molding composition comprising:
   (i) 95-70 weight percent of a polymer blend comprising:
      (a) 25-80 weight percent of nylon 6 having an inherent viscosity of about 0.6 to 2.5; and
      (b) 75-20 weight percent of a polyester component having an inherent viscosity of about 0.4 to 1.5 comprising terephthalic acid and glycol monomer units, said glycol comprising about 30 to 70 mole percent alkylene glycol and about 70 to 30 mole percent 1,4-cyclohexylenedimethanol monomer units; and (ii) 5-30 weight percent of a polyesteramide comprising $C_6$-$C_{15}$ alkylene dicarboxylic acid, diamine and glycol monomer units, wherein said glycol is about 75-90 mole percent of the combined glycol/diamine monomer units and is a $C_2$-$C_6$ alkylene glycol or 1,4-cyclohexylenedimethanol, and said diamine is about 25-10 mole percent of the combined glycol/diamine monomer units and is a $C_2$-$C_8$ alkylenediamine, 1,4-cyclohexane-bis-methylamine or piperazine or said glycol is about 10-25 mole percent of the combined glycol/diamine monomer units and is a $C_2$-$C_6$ alkylene glycol or 1,4-cyclohexanedimethanol, and said diamine is about 75-90 mole percent of the combined glycol/diamine monomer units and is a $C_2$-$C_8$ alkylenediamine, 1,4-cyclohexane-bis-methylamine or piperazine; wherein the inherent viscosities are determined at 25° C. using 0.50 g of polymer per 100 mole of a solvent consisting of 60 weight percent phenol and 40 weight percent tetrachloroethane.

9. A molding composition according to claim 8 wherein polymer blend (i) comprises:
   (a) 50-80 weight percent of nylon 6 having an inherent viscosity of about 1.0-1.5; and
   (b) 50-20 weight percent of a polyester component having an inherent viscosity of about 0.5-0.8 comprising terephthalic acid and glycol monomer units, said glycol comprising about 30 to 70 mole percent ethylene glycol and about 70 to 30 mole percent 1,4-cyclohexylenedimethanol monomer units; and the polyesteramide component comprises azelaic acid, diamine and glycol monomer units, wherein said glycol is about 80-85 mole percent of the combined glycol/diamine monomer units and is 1,4-butanediol or 1,4-cyclohexylenedimethanol, and said diamine is about 20-15 mole percent of the combined glycol/diamine monomer units and is hexamethylenediamine or piperazine.

10. A molding composition comprising:
(i) 90-80 weight percent of a polymer blend comprising:
   (a) 25-80 weight percent of nylon 6 having an inherent viscosity of about 0.6 to 2.5; and
   (b) 75-20 weight percent of a polyester component having an inherent viscosity of about 0.4 to 1.5 comprising terephthalic acid and glycol monomer units, said glycol comprising about 30 to 70 mole percent alkylene glycol and about 70 to 30 mole percent 1,4-cyclohexylenedimethanol monomer units; and (ii) 10-20 weight percent of a polyesteramide comprising $C_6$-$C_{15}$ alkylene dicarboxylic acid, diamine and glycol monomer units, wherein said glycol is about 50-90 mole percent of the combined glycol/diamine monomer units and is a $C_2$-$C_6$ alkylene glycol or 1,4-cyclohexylenedimethanol, and said diamine is about 50-10 mole percent of the combined glycol/diamine monomer units and is a $C_2$-$C_8$ alkylenediamine, 1,4-cyclohexane-bis-methylamine or piperazine or said glycol is about 10-25 mole percent of the combined glycol/diamine monomer units and is a $C_2$-$C_6$ alkylene glycol or 1,4-cyclohexanedimethanol, and said diamine is about 75-90 mole percent of the combined glycol/diamine monomer units and is a $C_2$-$C_8$ alkylenediamine, 1,4-cyclohexane-bis-methylamine or piperazine; wherein the inherent viscosities are determined at 25° C. using 0.50 g of polymer per 100 mole of a solvent consisting of 60 weight percent phenol and 40 weight percent tetrachloroethane.

11. A molding composition according to claim 8 wherein polymer blend (i) comprises:
   (a) 50-80 weight percent of nylon 6 having an inherent viscosity of about 1.0-1.5; and
   (b) 50-20 weight percent of a polyester component having an inherent viscosity of about 0.5-0.8 comprising terephthalic acid and glycol monomer units, said glycol comprising about 30 to 70 mole percent ethylene glycol and about 70 to 30 mole percent 1,4-cyclohexaylenedimethanol monomer units; and the polyesteramide component comprises azelaic acid, diamine and glycol monomer units, wherein said glycol is about 80-85 mole percent of the combined glycol/diamine monomer units and is 1,4-butanediol or 1,4-cyclohexylenedimethanol, and said diamine is about 20-15 mole percent of the combined glycol/diamine monomer units and is hexamethylenediamine or piperazine.

* * * * *